(12) United States Patent
Sun et al.

(10) Patent No.: US 8,027,306 B2
(45) Date of Patent: Sep. 27, 2011

(54) MISCELLANEOUS IMPROVEMENTS ON THE HRPD SYSTEM

(75) Inventors: Li-Hsiang Sun, San Diego, CA (US); Suk Woo Lee, San Diego, CA (US)

(73) Assignee: LG Electronics Inc., Seoul (KR)

(*) Notice: Subject to any disclaimer, the term of this patent is extended or adjusted under 35 U.S.C. 154(b) by 1224 days.

(21) Appl. No.: 11/676,255

(22) Filed: Feb. 16, 2007

(65) Prior Publication Data

US 2007/0201439 A1    Aug. 30, 2007

Related U.S. Application Data

(60) Provisional application No. 60/774,466, filed on Feb. 17, 2006.

(51) Int. Cl.
*H04J 3/08* (2006.01)
*H04W 4/00* (2009.01)
*H04L 12/66* (2006.01)

(52) U.S. Cl. ............ 370/331; 455/436; 455/435.2; 370/352

(58) Field of Classification Search ......... 370/329–331, 370/352; 455/435.1, 435.2, 552.1, 436
See application file for complete search history.

(56) References Cited

U.S. PATENT DOCUMENTS

| | | | |
|---|---|---|---|
| 6,545,997 B1 | 4/2003 | Bohnke et al. | |
| 6,657,949 B1 | 12/2003 | Jones, IV et al. | |
| 6,947,748 B2 | 9/2005 | Li et al. | |
| 2003/0137955 A1 | 7/2003 | Kim et al. | |
| 2003/0169824 A1 | 9/2003 | Chayat | |
| 2004/0037222 A1* | 2/2004 | Kim et al. | 370/229 |
| 2004/0090951 A1 | 5/2004 | Jung | |
| 2004/0176124 A1 | 9/2004 | Gopalakrishnan et al. | |
| 2004/0190485 A1 | 9/2004 | Khan | |
| 2005/0207267 A1 | 9/2005 | Birmingham, Sr. et al. | |
| 2005/0213555 A1* | 9/2005 | Eyuboglu et al. | 370/349 |

FOREIGN PATENT DOCUMENTS

JP    2004040787    2/2004

(Continued)

OTHER PUBLICATIONS

Purnadi et al., "Robust and Efficient Forward Link Radio Layer Architecture and MAC Layer Design in 3x EV-DV CDMA System," Vehicular Technology Conference, pp. 680-684, Sep. 2005, XP-010878558.

(Continued)

*Primary Examiner* — George Eng
*Assistant Examiner* — Nam Huynh
(74) *Attorney, Agent, or Firm* — Lee, Hong, Degerman, Kang & Waimey

(57) ABSTRACT

Mechanisms for improving the proposed high rate packet data (HRPD) system are provided. Approaches proposed are including PilotGroupID in the sector parameter message to convey the pilot group information, encoding to enable shortened NeighborList messages, improvements on RoutUpdateRequest message for request updates on multiple carriers, inclusive of the channel record of the reference pilot in the RouteUpdate message when the message sent in the connected state, using pilot drop timer of a Candidate Set pilot as a trigger for sending RouteUpdate, encoding the TrafficChannelAssignment message to shorten the message in certain situations, limiting the usage of auxiliary DRC cover in some situations to avoid confusion in determining the serving sector and processing OverheadMessages. Updated Indication and OverheadMessagesNeighborList Initialization in the idle state.

4 Claims, 23 Drawing Sheets

FOREIGN PATENT DOCUMENTS

| | | |
|---|---|---|
| TW | 541813 | 7/2003 |
| TW | 576039 | 2/2004 |
| WO | 02/080590 | 10/2002 |
| WO | 2004079947 | 9/2004 |
| WO | 2006/096764 | 9/2006 |
| WO | 2006/110874 | 10/2006 |
| WO | 2007/043815 | 4/2007 |

OTHER PUBLICATIONS

3rd Generation Partnership Project 2 (3GPP2), "cdma2000 High Rate Packet Data Air Interface Specification," 3GPP2 C.S0024-A, v 1.0, Mar. 2004.

* cited by examiner

CDMA SPREADING AND DESPREADING

CDMA SPREADING AND DESPREADING USING MULTIPLE SPREADING SEQUENCES

CDMA REVERSE POWER CONTROL

CDMA RAKE RECEIVER

CDMA 2000 CALL PROCESSING OVERVIEW

CDMA 2000 INITIALIZATION STATE

SYSTEM ACCESS STATE

CDMA 2000 MOBILE TRAFFIC CHANNEL STATE

CDMA 2000 MULTIPLEXING AND QoS CONTROL SUBLAYER TRANSMITTING FUNCTION

FIG. 11
COMPARISON OF CDMA2000 FOR 1x AND 1xEV-DO
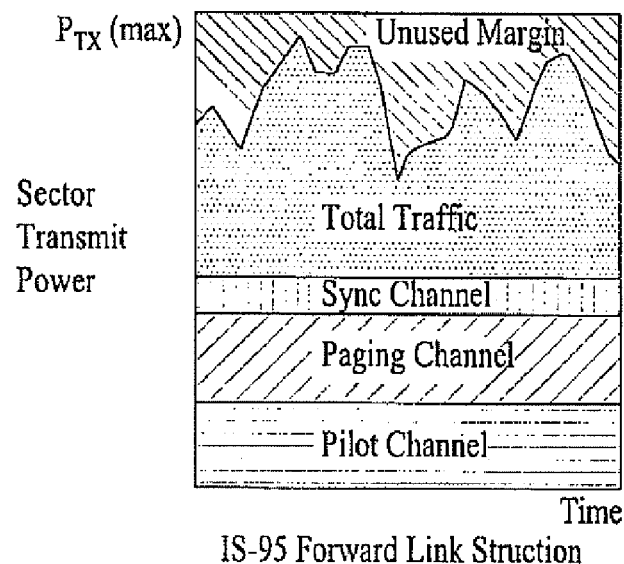
IS-95 Forward Link Struction
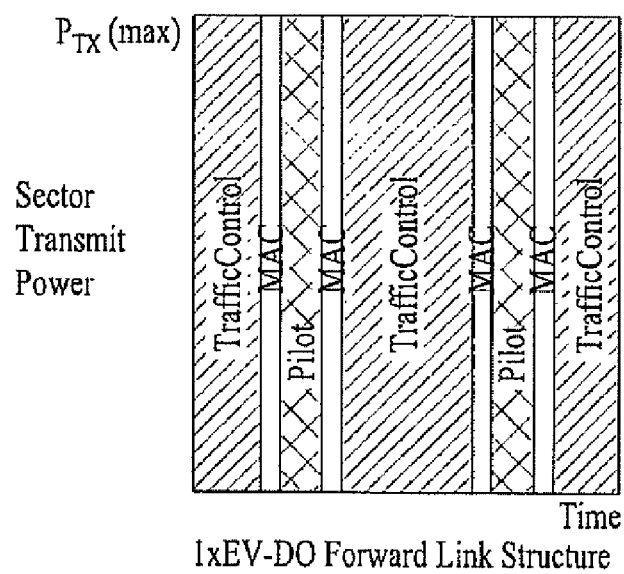
1xEV-DO Forward Link Structure 1xEV-DO NETWORK ARCHITECTURE 1xEV-DO PHYSICAL LAYER CHANNELS 1xEV-DO DEFAULT PROTOCOL 1xEV-DO NON-DEFAULT PROTOCOL 1xEV-DO SESSION ESTABLISHMENT 1xEV-DO CONNECTION LAYER PROTOCOLS

FIG. 18
NEIGHBORLIST MESSAGE

| Field | Length(bits) |
|---|---|
| MessageID | 8 |
| Count | 5 |

Count occurrences of the following field:

| Field | Length(bits) |
|---|---|
| PilotPN | 9 |

Count occurrences of the following two fields:

| Field | Length(bits) |
|---|---|
| ChannelIncluded | 1 |
| Channel | 0 or 24 |

| Field | Length(bits) |
|---|---|
| SearchWindowSizeIncluded | 1 |

Count occurrences of the following field:

| Field | Length(bits) |
|---|---|
| SearchWindowSize | 0 or 4 |

| Field | Length(bits) |
|---|---|
| SearchWindowOffsetIncluded | 1 |

Count occurrences of the following field:

| Field | Length(bits) |
|---|---|
| SearchWindowOffset | 0 or 3 |

| Field | Length(bits) |
|---|---|
| FPDCHSupportedIncluded | 0 or 1 |

$m, 0 \leq m \leq$ Count, occurrences of the following field:

| Field | Length(bits) |
|---|---|
| FPDCHSupported | 0 or 1 |

Count-m occurrences of the following two fields:

| Field | Length(bits) |
|---|---|
| PilotGroupIDIncluded | 1 |
| PilotGroupID | 0 or 3 |

| Field | Length(bits) |
|---|---|
| Reserved | Variable |

FIG. 19A
SECTOR PARAMETERS MESSAGE

| Field | Length(bits) |
|---|---|
| MessageID | 8 |
| CountyCode | 12 |
| SectorID | 128 |
| SubnetMask | 8 |
| SectorSignature | 16 |
| Latitude | 22 |
| Longitude | 23 |
| RouteUpdateRadiusOverhead | 11 |
| LeapSeconds | 8 |
| LocalTimeOffset | 11 |
| ReverseLinkSilenceDuration | 2 |
| ReverseLinkSilencePeriod | 2 |
| ChannelCount | 5 |

ChannelCount occurrences of the following field:

| Channel | 24 |
|---|---|

| NeighborCount | 5 |
|---|---|

NeighborCount occurrences of the following field:

| NeighborPilotPN | 9 |
|---|---|

NeighborCount occurrences of the following two fields:

| NeighborChannelIncluded | 1 |
|---|---|
| NeighborChannel | 0 or 24 |

| NeighborSearchWindowSizeIncluded | 1 |
|---|---|

NeighborCount occurrences of the following field:

| NeighborSearchWindowSize | 0 or 4 |
|---|---|

| NeighborSearchWindowOffsetIncluded | 1 |
|---|---|

FIG. 19B
SECTOR PARAMETORS MESSAGE

| Field | Length(bits) |
|---|---|
| NeighborCount occurrences of the following field: | |
| NeighborSearchWindowOffset | 0 or 3 |

| Field | Length(bits) |
|---|---|
| ExtendedChannelIncluded | 0 or 1 |
| ExtendedChannelCount | 0 or 5 |
| 0 or ExtendedChannelCount occurrences of the following field: | |
| ExtendedChannel | 24 |

| Field | Length(bits) |
|---|---|
| AccessHashingChannelMaskIncluded | 0 or 1 |
| AccessHashingMaskLength | 0 or 4 |
| n, occurrences of the following record, where 0 ≤ n ≤ (ChannelCount+ExtendedChannelCount): | |
| AccessHashingChannelMaskSameAsPrevious | 1 |
| AccessHashingChannelMask | 0 or AccessHashingMaskLength+1 |

| Field | Length(bits) |
|---|---|
| RouteUpdateTriggerCodeIncluded | 0 or 1 |
| RouteUpdateTriggerCode | 0 or 12 |
| RouteUpdateTriggerMaxAge | 0 or 4 |
| PriorSessionGAUP | 0 or 1 |
| FPDCHSupportedIncluded | 0 or 1 |
| m, 0 ≤ m ≤ NeighborCount, occurrences of the following field: | |
| FPDCHSupported | 0 or 1 |
| NeighborCount+1-m occurrences of the following two fields: | |
| PilotGroupIDIncluded | 0 or 1 |
| PilotGroupID | 0 or 3 |

| Field | Length(bits) |
|---|---|
| IsSectorMultiCarrierCapable | 0 or 1 |
| Reserved | 0~7(as needed) |

FIG. 20
ROUTEUPDATE MESSAGE

| Field | Length(bits) |
|---|---|
| MessageID | 8 |
| MessageSequence | 8 |
| ReferencePilotPN | 9 |
| ReferencePilotStrength | 6 |
| ReferenceKeep | 1 |
| NumPilots | 4 |

NumPilots occurrences of the following fields:

| | |
|---|---|
| PilotPNPhase | 15 |
| ChannelIncluded | 1 |
| Channel | 0 or 24 |
| PilotStrength | 6 |
| Keep | 1 |

| | |
|---|---|
| ATTotalPilotTransmissionIncluded | 0 or 1 |
| ATTotalPilotTransmission | 0 or 8 |
| ReferencePilotChannelIncluded | 0 or 1 |
| ReferencePilotChannel | 0 or 24 |

| | |
|---|---|
| Reserved | Variable |

FIG. 21
ROUTEUPDATEREQUEST MESSAGE

| Field | Length(bits) |
|---|---|
| MessageID | 8 |
|  |  |
|  |  |
| PilotCount | 0 or 4 |

PilotCount occurrences of the following two fields:

| Field | Length(bits) |
|---|---|
| PilotPN | 9 |
| ChannelIndluded | 1 |
| Channel | 0 or 24 |

| Field | Length(bits) |
|---|---|
| SectorSearchWindowSizeIncluded | 0 or 1 |

SectorCount occurrences of the following field:

| Field | Length(bits) |
|---|---|
| SectorSearchWindowSize | 0 or 4 |

| Field | Length(bits) |
|---|---|
| SectorSearchWindowOffsetIncluded | 0 or 1 |

SectorCount occurrences of the following field:

| Field | Length(bits) |
|---|---|
| SectorSearchWindowOffset | 0 or 3 |

| Field | Length(bits) |
|---|---|
| Reserved | 0~7(as needed) |

FIG. 22
NUMUNIQUE TRAFFICMACINDEXES MESSAGE

| SectorInThisFrequencyIncluded | 1 |
|---|---|
| PilotCarriesControlChannel | 0 or 1 |
| PilotGroupID | 0 or 3 |
| NumUniqueTrafficMACIndexes | 0 or 3 |
| SchedulerTag | 0 or 7 |
| AuxDRCCoverIncluded | 0 or 1 |
| AuxDRCCover | 0 or 3 |
| TrafficMACIndexPerInterlaceEnabled | 0 or 1 |

NumUniqueTrafficMACIndexes(if included) or 0 occurrences of the following field:

| AssignedInterlaces | 0 or 4 |
|---|---|
| TrafficMACIndex | 0 or 10 |

MOBILE STATION/ACCESS TERMINAL

MISCELLANEOUS IMPROVEMENTS ON THE HRPD SYSTEM

CROSS-REFERENCE TO RELATED APPLICATIONS

Pursuant to 35 U.S.C. §119(a), this application claims the benefit of U.S. Provisional Application Ser. No. 60/774,466 filed on Feb. 17, 2006, the contents of which is hereby incorporated by reference herein in its entirety.

FIELD OF THE INVENTION

The present invention relates to mechanisms for improving the high rate packet data (HRPD) system.

DESCRIPTION OF THE RELATED ART

In the world of cellular telecommunications, those skilled in the art often use the terms 1G, 2G, and 3G, The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

Referring to FIG. 1, a wireless communication network architecture 1 is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or Public long code Mask, computed using the long PN code ESN of 32-bits and 10 bits set by the system. The Public long code Mask produces a unique shift. Private long code Masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN Offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific Public or Private long code Mask and there are as many reverse traffic channels as there are CDMA terminals.

An MS 2 not yet involved in a call uses access channels to transmit registration requests, call setup requests, page responses, order responses and other signaling information. An access channel is basically a Public long code Offset unique to a BTS 3 sector. Access channels are paired with paging channels, with each paging channel having up to 32 access channels.

CDMA communication provides many advantages. Some of the advantages are variable rate vocoding and multiplexing, forward power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Reverse power control uses three methods in tandem to equalize all terminal signal levels at the BTS 3. Reverse open loop power control is characterized by the MS 2 adjusting power up or down based on a received BTS 3 signal (AGC). Reverse closed loop power control is characterized by the BTS 3 adjusting power up or down by 1 db at a rate of 800 times per second. Reverse outer loop power control is characterized by the BSC 4 adjusting a BTS 3 set point when the BSC has forward error correction (FER) trouble hearing the MS 2. FIG. 3 illustrates the three reverse power control methods.

The actual RF power output of the MS 2 transmitter (TXPO), including the combined effects of open loop power control from receiver AGC and closed loop power control by the BTS 3, cannot exceed the maximum power of the MS, which is typically +23 dbm. Reverse power control is performed according to the equation "TXPO=$-(RX_{dbm})$-C+TXGA," where "TXGA" is the sum of all closed loop power control commands from the BTS 3 since the beginning of a call and "C" is +73 for 800 MHZ systems and +76 for 1900 MHz systems.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals. FIG. 4 illustrates the use of a RAKE receiver.

The MS 2 drives soft Handoff. The MS 2 continuously checks available pilot signals and reports to the BTS 3 regarding the pilot signals it currently sees. The BTS 3 assigns up to a maximum of six sectors and the MS 2 assigns its fingers accordingly. Al messages are sent by dim-and-burst without muting. Each end of the communication link chooses the best configuration on a frame-by-frame basis, with handoff transparent to users.

The MS 2 considers pilot signals in sets, specifically an Active set, a Candidates set, a Neighbors set and a Remaining set. The Active set include the pilot signals of sectors actually in use. The Candidates set includes pilot signals requested by the MS 2 but not yet set up for transmitting by the BTS 3. The Neighbors set includes pilot signals indicated by the BTS 3 as nearby sectors to check. The Remaining set includes any pilot signals used by the BTS 3 but not already in the other sets.

The MS 2 sends the pilot signal strength measurements to the BTS 3 whenever a pilot signal in a Neighbor or Remaining set exceeds a first threshold (T_ADD), an Active set pilot signal drops below a second threshold (T_DROP) or a Candidate pilot signal exceeds an Active set pilot signal by a given amount (T_COMP). The BTS 3 may set up all requested handoffs or may apply screening criteria to authorize only some requested handoffs.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 5 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

In the MS 2, the Signaling Services sublayer 63 is also responsible for maintaining call process states, specifically a MS 2 Initialization State, MS 2 Idle State, System Access State and MS 2 Control on Traffic Channel State.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

FIG. 6 illustrates an overview of call processing. Processing a call includes pilot and sync channel processing, paging channel processing, Access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

FIG. 7 illustrates the initialization state of an MS 2. The Initialization state includes a System Determination Substate, pilot channel processing, sync channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System determination. A service provider using a redirection process may also control System determination. After the MS 2 selects a system, it must determine on which channel within that system to search for service, Generally the MS 2 uses a prioritized channel list to select the channel.

Pilot channel processing is a process whereby the MS 2 first gains information regarding system timing by searching for usable pilot signals. Pilot channels contain no information, but the MS 2 can align its own timing by correlating with the pilot channel, Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During system acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

The cdma2000 messages are backward compatible with IS-95 MS 2. For example, the first 13 fields of the sync channel message are identical to those specified in IS-95. When an IS-95 MS 2 acquires a sync channel, it examines only the first 13 fields and ignores the remaining fields.

All new cdma2000 fields occur after the IS-95 compatible fields. The new cdma2OOO fields specify parameters for the Spreading Rate 1 Broadcast control channel (BCCH) for TD and non-TD modes and for the Spreading Rate 3 BCCH and pilot channel.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMSI to determine which channel and frequency to monitor in the Idle State. The BS 6 uses the same hash function to determine which channel and frequency to use when paging the MS 2.

FIG. 8 illustrates the System Access state. The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

FIG. 9 illustrates a Mobile Traffic Channel state. The Mobile Traffic Channel state includes Service Negotiation, an Active Mode and a Control Hold Mode.

Service Negotiation is a process by which the MS 2 and the BS 6 negotiate which service options will be used during a call and how the radio channel will be configured to support those services. Typically, service negotiation occurs at the beginning of a call, although it may occur at any time during a call if necessary.

While operating in the Traffic Channel Substate, the MS 2 may operate in either the Active Mode or the Control Hold Mode. In the Active Mode, the reverse pilot channel is active, along with either the R-FCH, R-DCCH. R-SCH or R-PDCH may be active if high-speed data is available. In the Control Hold Mode, only the reverse pilot channel is transmitted and it may be operating in a gated mode, such as ½ or ¼, to reduce transmit power.

FIG. 10 illustrates the transmitting function of the Multiplexing and QoS Control sublayer 34. A data Block is a block of data that belongs to the same service or signaling. A Mux-PDU is a MuxSDU and Header. The header specifies the signaling as primary or secondary. The MuxPDU Type determines the Rate Set and how to parse the MuxPDU. The Mux Option determines a maximum number of MuxPDUs on the SCH, Single-size or Double Size MuxPDUs and MuxPDU Types. The LTU includes 1, 2, 4 or 8 MuxPDUs that are protected by CRC.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1×EV-DO system is optimized for packet data service and characterized by a single 1.25 MHz carrier ("1×") for data only or data Optimized ("DO"). Furthermore, there is a peak data rate of 4.91512 Mbps on the forward Link and 1.8432 Mbps on the reverse Link. Moreover 1×EV-DO provides separated frequency bands and internetworking with a 1× System. FIG. 11 illustrates a comparison of cdma2000 for 1× and 1×EV-DO.

In a cdma 2000 system, there are concurrent services, whereby voice and data are transmitted together at a maximum data rate of 614.4 kbps and 307.2 kbps in practice. An MS 2 communicates with the MSC 5 for voice calls and with the PDSN 12 for data calls. CDMA2000 is characterized by a fixed rate with variable power with a Walsh-code separated forward traffic channel.

In a 1×EV-DO system, the maximum data rate is 2.4 Mbps or 3.072 Mbps and there is no communication with the circuit-switched core network 7. 1×EV-DO is characterized by fixed power and a variable rate with a single forward channel that is time division multiplexed.

FIG. 12 illustrates a 1×EV-DO system architecture. In a 1×EV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1×EV-DO system facilitates simpler and faster channel estimation and time synchronization.

FIG. 13 illustrates Physical Layer channels for a 1×EV-DO system. FIG. 14 illustrates a 1×EV-DO default protocol architecture. FIG. 15 illustrates a 1×EV-DO non-default protocol architecture.

Information related to a session in a 1×EV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

FIG. 16 illustrates the establishment of a 1×EV-DO session. As illustrated in FIG. 16, establishing a session includes address configuration, Connection Establishment, Session configuration and Exchange Keys.

Address configuration refers to an Address Management protocol assigning a UATI and Subnet mask. Connection Establishment refers to Connection Layer protocols setting up a radio link. Session configuration refers to a Session Configuration Protocol configuring all protocols. Exchange Keys refers a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6. FIG. 32 illustrates a 1×EV-DO session.

When a connection is opened, the AT 2 can be assigned the forward traffic channel and is assigned a reverse traffic channel and reverse power control channel. Multiple connections may occur during single session. There are two connection states in a 1×EV-DO system, a closed connection and an Open connection.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Connection Layer manages initial acquisition of the network, setting an Open connection and closed connection and communications. Furthermore, the Connection Layer maintains an approximate AT 2 location in both the Open connection and closed connection and manages a radio link between the AT 2 and the AN 6 when there is an Open connection. Moreover, the Connection Layer performs supervision in both the Open connection and closed connection, prioritizes and encapsulates transmitted data received from the Session Layer, forwards the prioritized data to the Security Layer and decapsulates data received from the Security Layer and forwards it to the Session Layer.

FIG. 17 illustrates Connection Layer Protocols. As illustrated in FIG. 17, the protocols include an Initialization State, an Idle State and a Connected State.

In the Initialization State, the AT 2 acquires the AN 6 and activates the initialization State Protocol. In the Idle State, a closed connection is initiated and the Idle State Protocol is activated. In the connected State, an Open connection is initiated and the Connected State Protocol is activated.

The Initialization State Protocol performs actions associated with acquiring an AN 6. The Idle State Protocol performs actions associated with an AT 2 that has acquired an AN 6, but does not have an Open connection, such as keeping track of the AT location using a Route Update Protocol. The Connected State Protocol performs actions associated with an AT 2 that has an Open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet demultiplexing on the receiver.

The 1×EV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in CDMA2000. The control channel is characterized by a period of 256 slots or 426.67 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The MAC channel provides a reverse Activity (RA) channel, a reverse power control channel, a DRCLock channel, an ARQ channel and a pilot channel.

The reverse Activity (RA) channel is used by the AN 2 to inform all ATs within its coverage area of the current activity on the reverse Link and is a MAC channel with MAC Index 4. The RA channel carries reverse Activity Bits (RAB), with RAB transmitted over RABLength successive slots (Subtype 0, 1) with a bit rate of (600/RABLength) bps or 600 bps.

The AN 6 uses the reverse power control (RPC) channel for power control of the AT's 2 reverse link transmissions. A reverse power control Bit is transmitted through the RPC channel, with a data rate of 600(1-1/DRCLockPeriod) bps or 150 bps.

The DRCLock channel prevents a situation where the DRC does not schedule an AT 2 for forward transmission and the AT continues to request service through the DRC if a sector cannot hear the DRC for the particular AT. If the DRCLock bit for the AT 2 is set, the AT stops sending the DRC to the sector. The DRCLock channel data rate is 600/(DRCLockLength× DRCLockPeriod) bps or (150/DRCLockLength) bps.

The ARQ channel supports reverse Link Hybrid-ARQ (H-ARQ), whereby remaining sub-packets are not transmitted if the AN 6 has resolved the Physical Layer packet. H-ARQ indicates whether the AN 6 successfully received the packet transmitted in slot m-8, m-7, m-6 and m-5.

The traffic operations supported by the forward Link include data Rate control (DRC) reporting, Scheduling at the BS 6, data transmission to the selected user and ACK/NAK.

Data Rate control (DRC) reporting facilitates an AT 2 reporting DRC as often as once every 1.67 ms. Each active AT 2 measures its radio conditions and provides the measurements to the BS 6, with a data rate of (600DRCLength) DRC values per second. Parameters reported include DRCLength, DRCGating, DRCLock channel, DRCOffset and DRC channel.

DRCLength determines how often DRC values are computed by the AT 2 and determines the gain for the DRC channel, with the lowest for 8 slots. Possible values are 1, 2, 4 or 8 slots.

DRCGating determines whether the AT 2 sends the DRC values continuously or discontinuously. Possible values are 0×00 for continuous and 0×01 for discontinuous.

DRCOffset facilitates computing the transmitted DRC by subtracting the DRCOffset from the tentative DRC and is suitable for a more realistic environment.

DRC channel is used by the AT 2 to indicate the selected serving sector and the requested data rate on the forward traffic channel to the AN 6. The requested data rate is mapped into a 4-digit DRC value, with an 8-ary Walsh function corresponding to the selected serving sector used to spread the DRC channel transmission. The DRCCover from the Forward Traffic Channel MAC protocol defines the cover mapping. DRC values are transmitted at a data rate of 600/DRCLength DRC values per second, with a maximum rate of 600 per second and a minimum rate of 75 per second.

Scheduling at the BS 6 is implemented at the sector and facilitates a BS determining which user's data should be transmitted next by allocating the bandwidth to different ATs 2 based on their DRCs. Possible Schedulers include Round Robin, Best Rate and Proportional Fairness. Scheduler Inputs include DRC, ACK/NAK, QoS and Subscriber profile, History, Traffic Model and AT Capability.

Round Robin emphasizes basic fairness. Best Rate emphasizes throughput. Proportional Fairness balances both fairness and throughput.

Data transmission to the selected user facilitates a BS 6 determining the FL data rate, modulation scheme and coding rate using the reported DRC. In Fat Pipe Scheduling, all ATs 2 in a sector share the 1.25 MHz radio carrier, with the pipe divided into 1.667 ms slots and, if a packet requires more than one slot, fragments of the packet are transmitted on four slot intervals.

In 4-slot Interlacing, transmission slots of a Physical Layer packet are separated by three slots, with other Physical Layer packets transmitted in the slots between those transmit slots. If ACK is received on the ACK channel before all of the allocated slots have been transmitted, remaining untransmitted slots are not transmitted (Hybrid ARQ).

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method for providing a message to a terminal in a multi-carrier mobile communication system comprising a plurality of cell sectors, each of the plurality of cell sectors comprising a plurality of carriers is provided. The method includes transmitting a message to the terminal, the message comprising first information and second information, the first information indicating that the second information is included in the message and the second information indicating a specific group of the plurality of carriers in a sector from which the terminal is presently receiving the message.

It is contemplated that the specific group comprises at least one carrier. It is further contemplated that the second information is a PilotGroupID.

It is contemplated that the indication is a PilotGroupIDincluded flag. It is further contemplated that the message is a SectorParameters message.

In another aspect of the present invention, a method for providing information to a network in a multi-carrier mobile communication system in which a terminal communicates with the network over a plurality of carriers is provided. The method includes transmitting a message to the network, the message comprising first information and second information, the first information indicating that the second information is included in the message and the second information indicating a specific one of the plurality of carriers on which a first pilot is transmitted.

It is contemplated that the second information is a ReferencePilotChannel. It is further contemplated that the message is a RouteUpdate message.

In another aspect of the present invention, a method for providing control information to a terminal in a multi-carrier mobile communication system is provided. The method includes transmitting a control message to the terminal, the message comprising a plurality of at least four consecutive fields, wherein the exclusion of or a specific value of a first of the plurality of at least four consecutive fields allows the exclusion of the following three consecutive of the plurality of at least four consecutive fields such that the length of the message is reduced.

It is contemplated that the exclusion of or a specific value of the first of the plurality of at least four consecutive fields allows the exclusion of a fifth of the plurality of at least four consecutive fields such that the length of the message is reduced. It is further contemplated that the plurality of at least four consecutive fields comprises NumUniqueTrafficMACIndexes, SchedulerTag, AuxDRCCoverIncluded and AuxDRCCover.

It is contemplated that the plurality of at least four consecutive fields comprises AuxDRCCoverIncluded. It is further contemplated that the plurality of at least four consecutive fields comprises AuxDRCCover.

It is contemplated that the plurality of at least four consecutive fields comprises NumUniqueTrafficMACIndexes. It is further contemplated that the plurality of at least four consecutive fields comprises SchedulerTag.

It is contemplated that the plurality of at least four consecutive fields comprises SchedulerTag, AuxDRCCoverIncluded and AuxDRCCover. It is further contemplated that the plurality of at least four consecutive fields comprises NumUniqueTrafficMACIndexes, AuxDRCCoverIncluded and AuxDRCCover.

It is contemplated that the plurality of at least four consecutive fields comprises NumUniqueTrafficMACIndexes, SchedulerTag, and AuxDRCCover. It is further contemplated that the plurality of at least four consecutive fields comprises NumUniqueTrafficMACIndexes, SchedulerTag and AuxDRCCoverIncluded.

It is contemplated that the plurality of at least four consecutive fields comprises NumUniqueTrafficMACIndexes and SchedulerTag. It is further contemplated that the plurality of at least four consecutive fields comprises NumUniqueTrafficMACIndexes and AuxDRCCoverIncluded.

It is contemplated that the plurality of at least four consecutive fields comprises NumUniqueTrafficMACIndexes and AuxDRCCover. It is further contemplated that the plurality of at least four consecutive fields comprises SchedulerTag and AuxDRCCover.

It is contemplated that the plurality of at least four consecutive fields comprises SchedulerTag and AuxDRCCoverIncluded. It is further contemplated that the plurality of at least four consecutive fields comprises AuxDRCCoverIncluded and AuxDRCCover. Preferably, the message is a TCA (Traffic Channel Assignment) message.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 11 illustrates a comparison of cdma2000 for 1× and 1×EV-DO.

FIG. 18 illustrates a NeighborList message according to one embodiment of the present invention.

FIGS. 19A and B illustrate a SectorParameters message according to one embodiment of the present invention.

FIG. 20 illustrates a RouteUpdate message according to one embodiment of the present invention.

FIG. 21 illustrates a RouteUpdateRequest message according to one embodiment of the present invention.

FIG. 22 illustrates a illustrates a NumUniqueTrafficMACIndexes message according to one embodiment of the present invention.

DETAILED DESCRIPTION OF THE PREFERRED EMBODIMENTS

Figure 1:
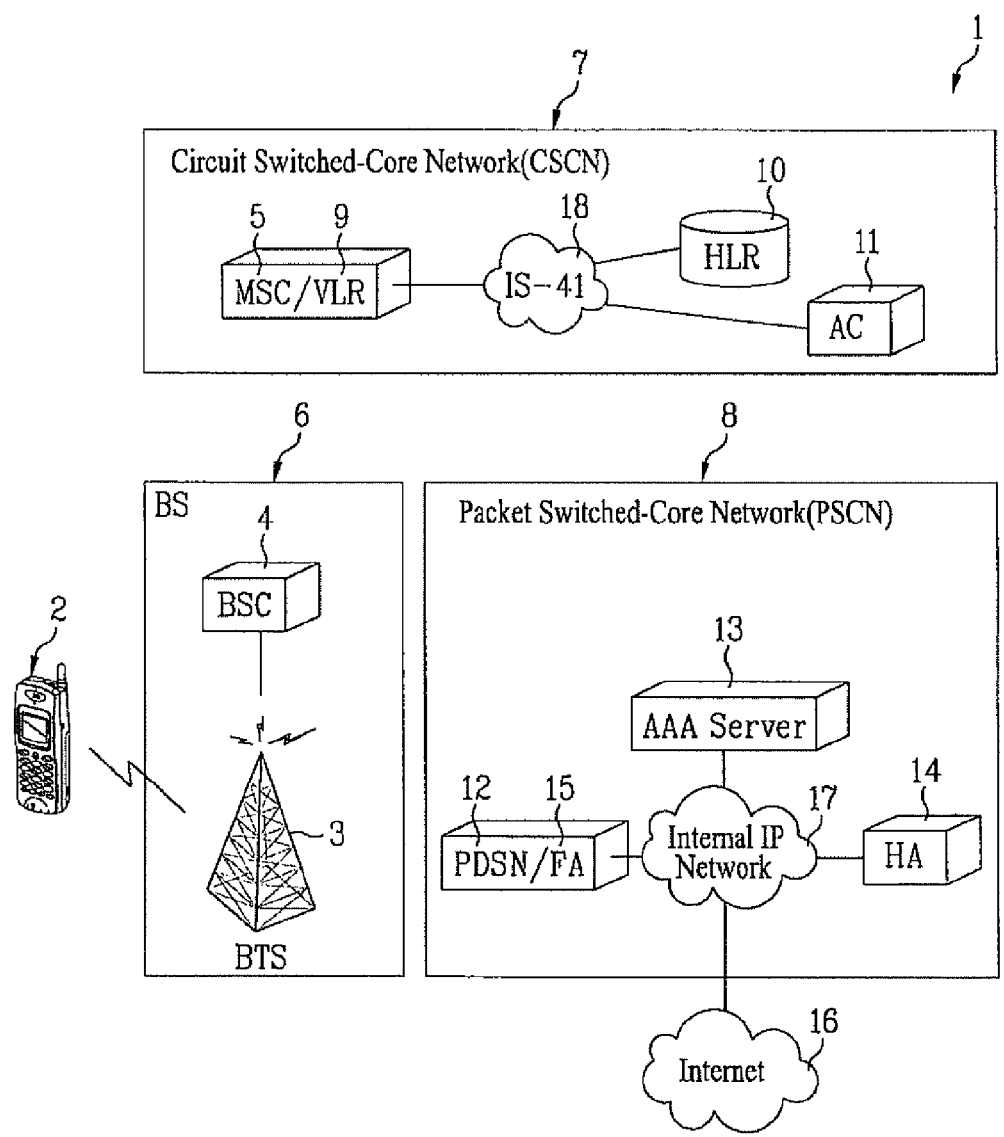
FIG. 1 illustrates wireless communication network architecture.
Figure 2A:
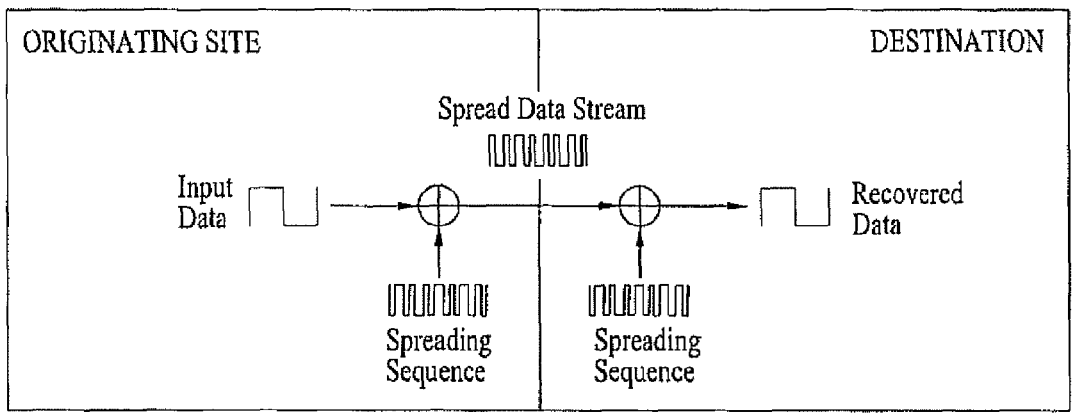
FIG. 2A illustrates a CDMA spreading and de-spreading process.
Figure 2B:
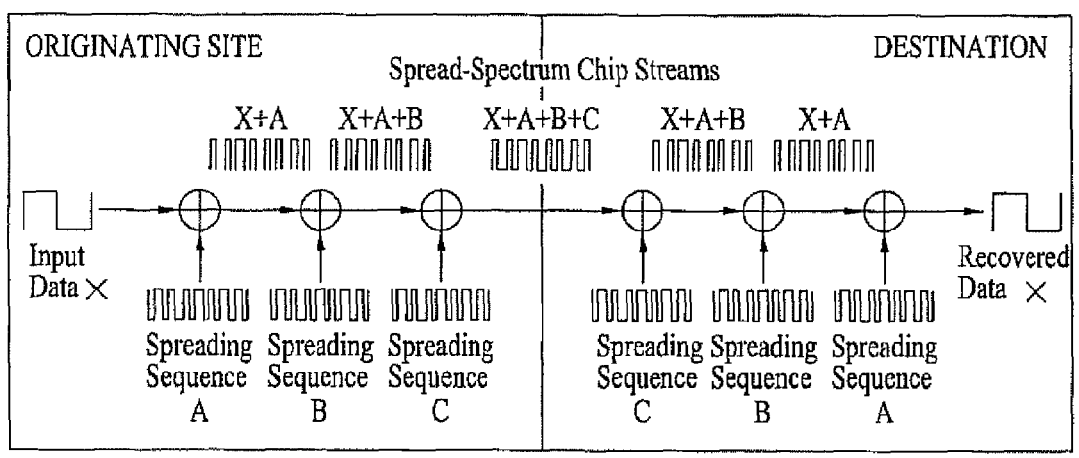
FIG. 2B illustrates a CDMA spreading and de-spreading process using multiple spreading sequences.
Figure 3:
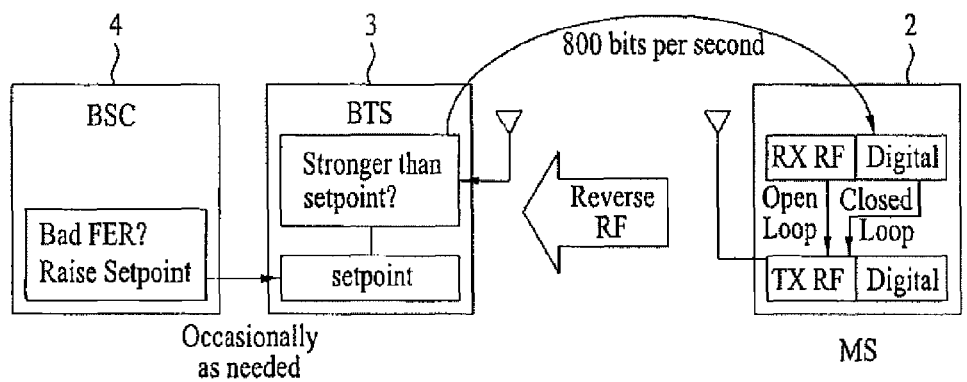
FIG. 3 illustrates CDMA reverse power control methods.
Figure 4:
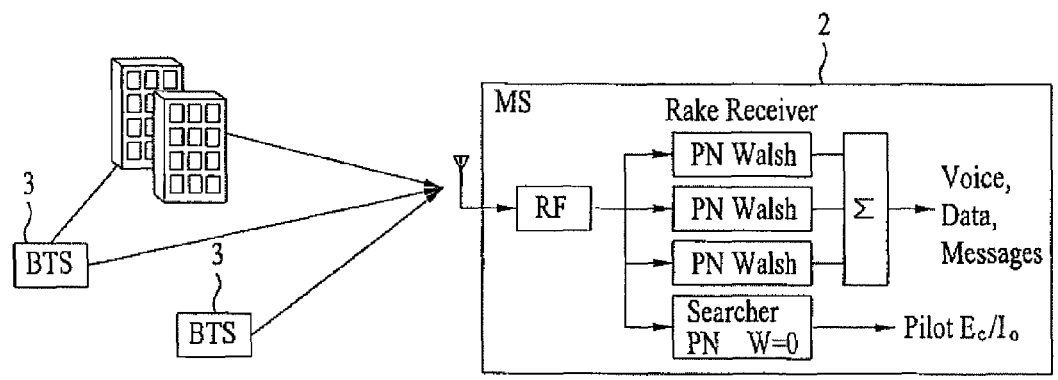
FIG. 4 illustrates a CDMA rake receiver.
Figure 5:
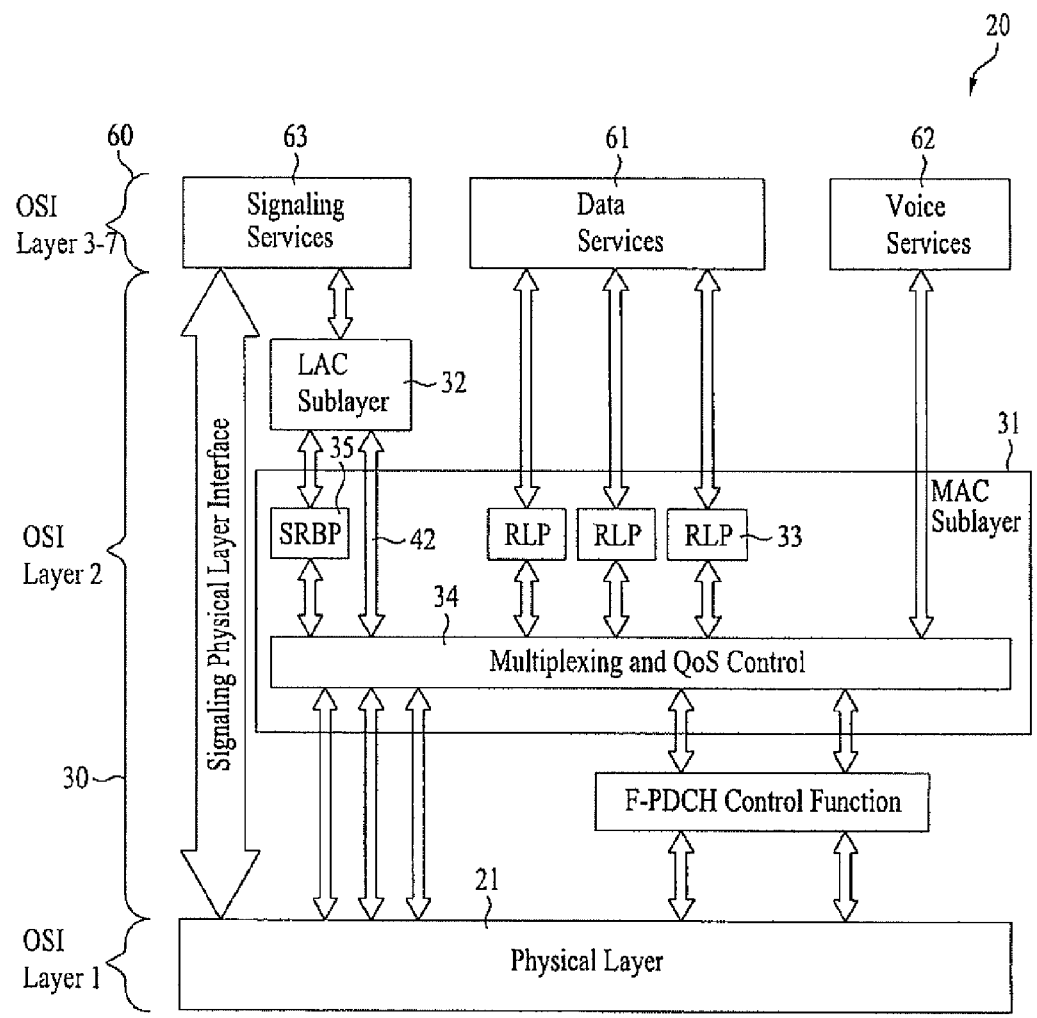
FIG. 5 illustrates a data link protocol architecture layer for a cdma2000 wireless network.
Figure 6:
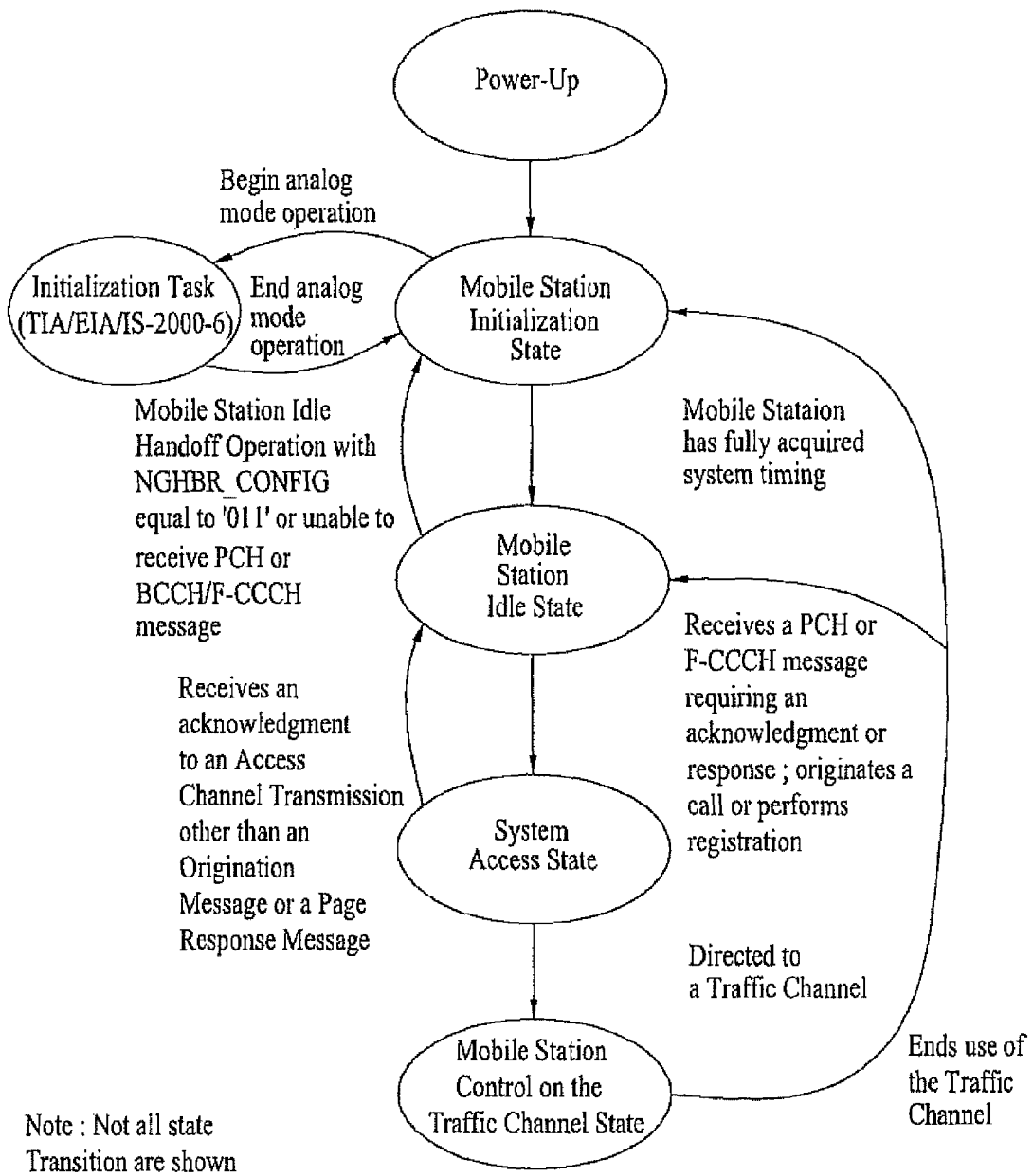
FIG. 6 illustrates cdma2000 call processing.
Figure 7:
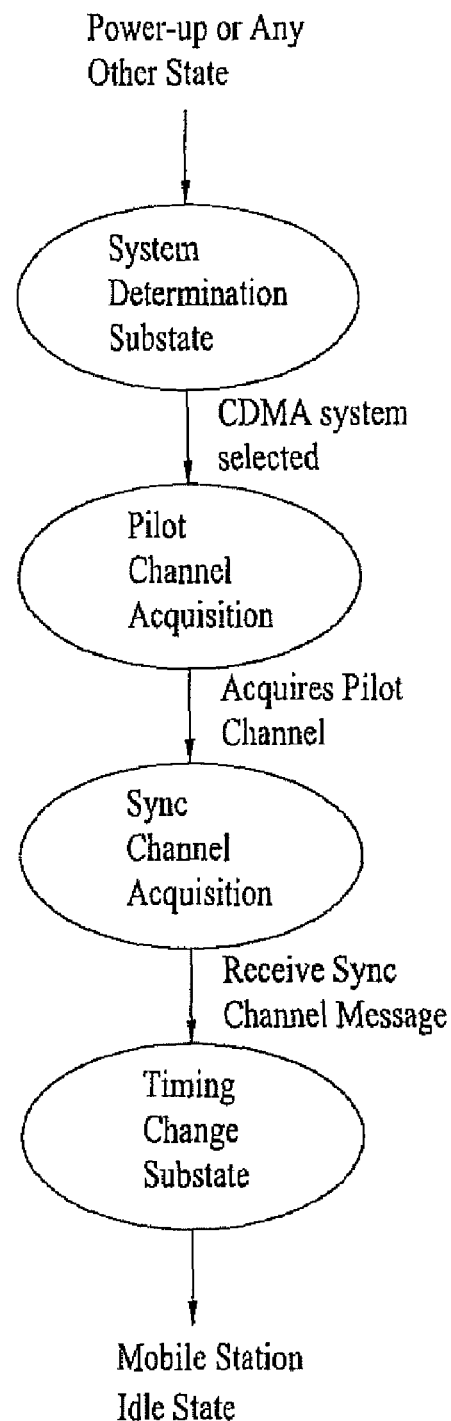
FIG. 7 illustrates the cdma2000 initialization state.
Figure 8:
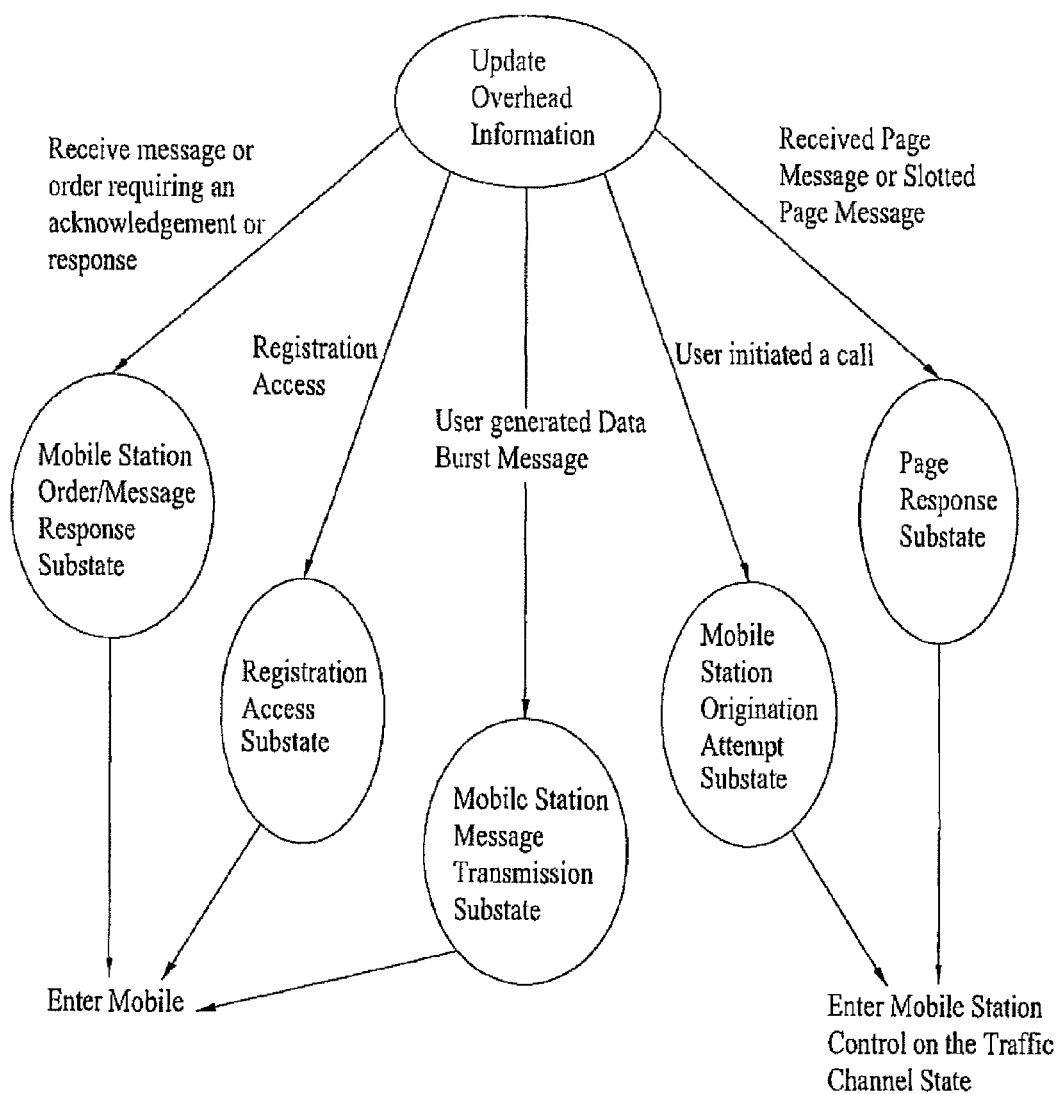
FIG. 8 illustrates the cdma2000 system access state.
Figure 9:
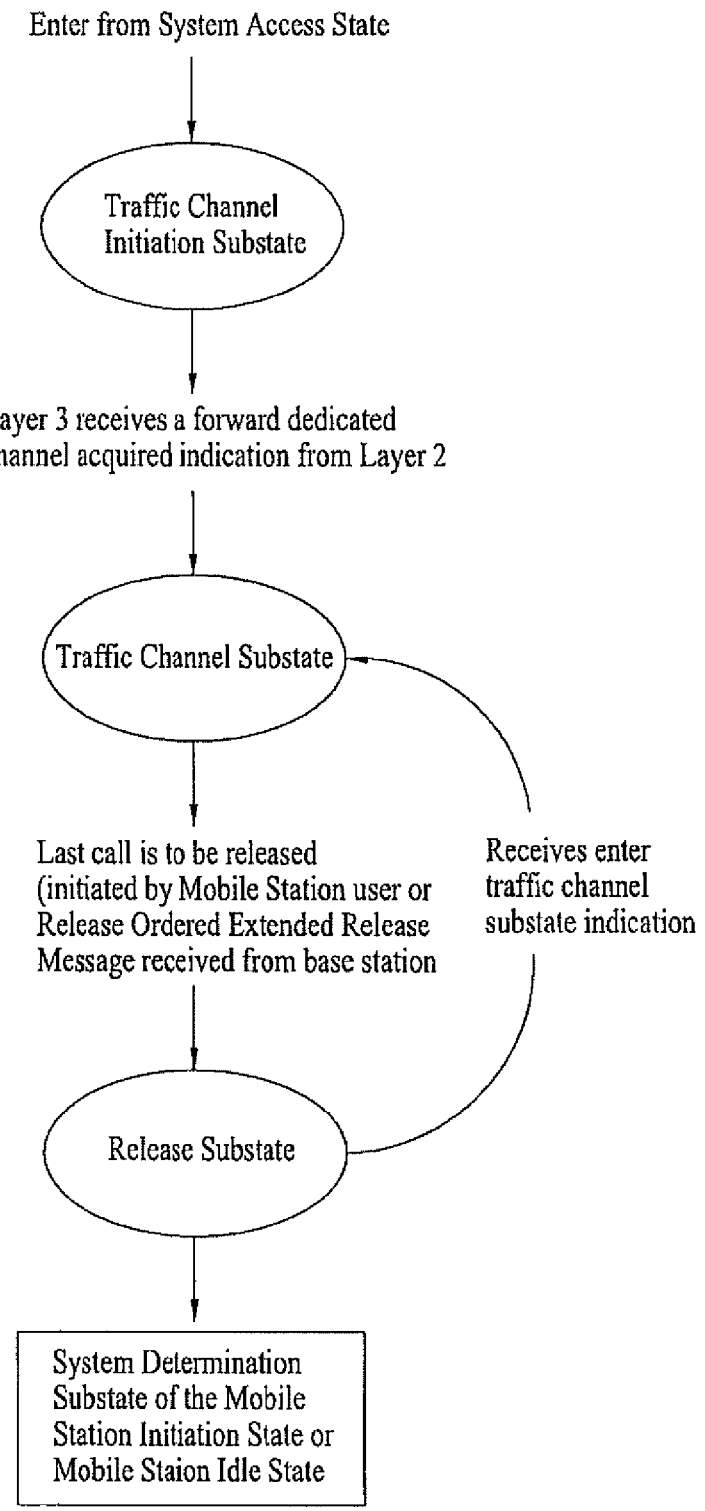
FIG. 9 illustrates the cdma2000 mobile traffic channel state.
Figure 10:
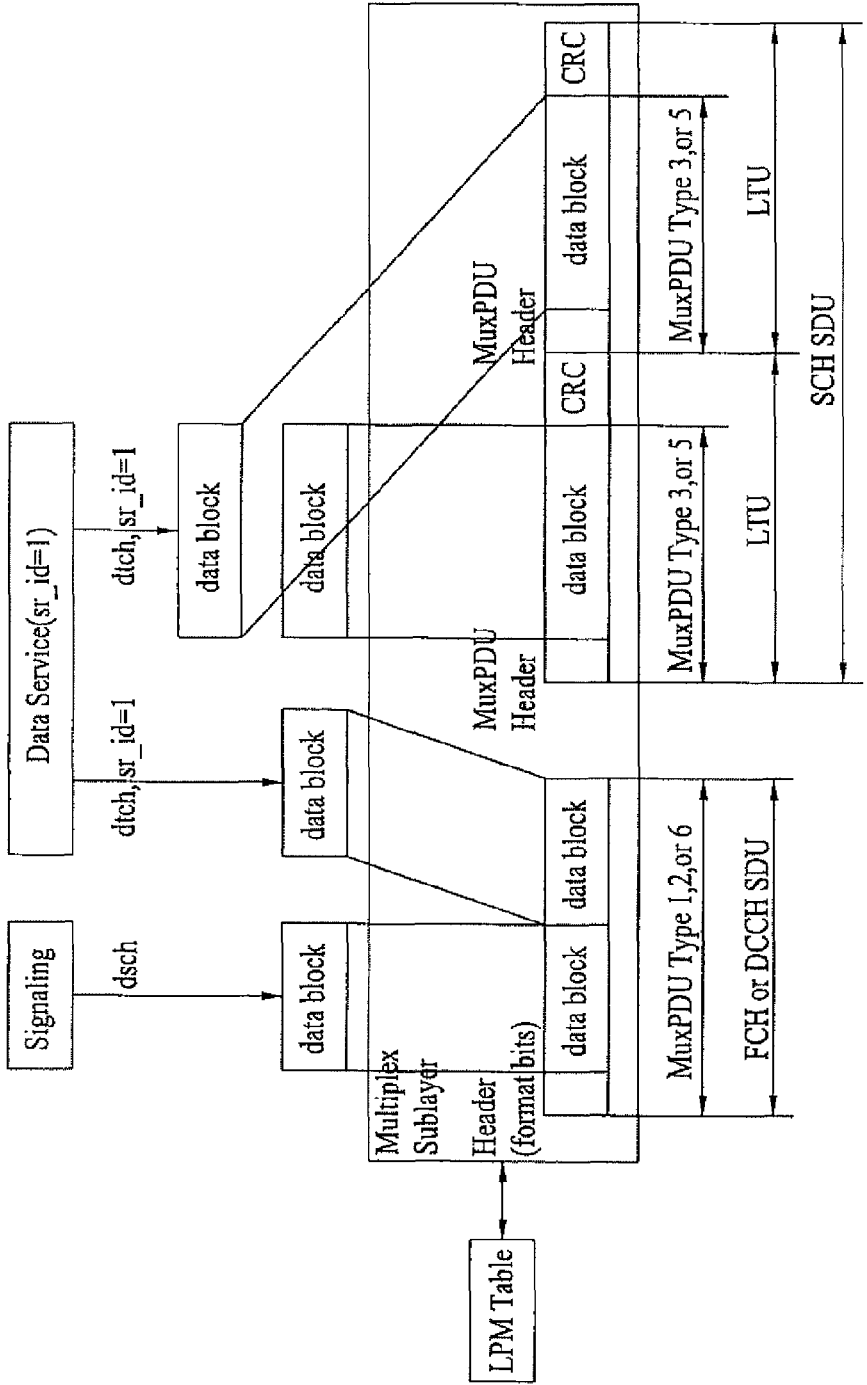
FIG. 10 illustrates the cdma2000 multiplex and QoS sublayer transmitting function.
Figure 12:
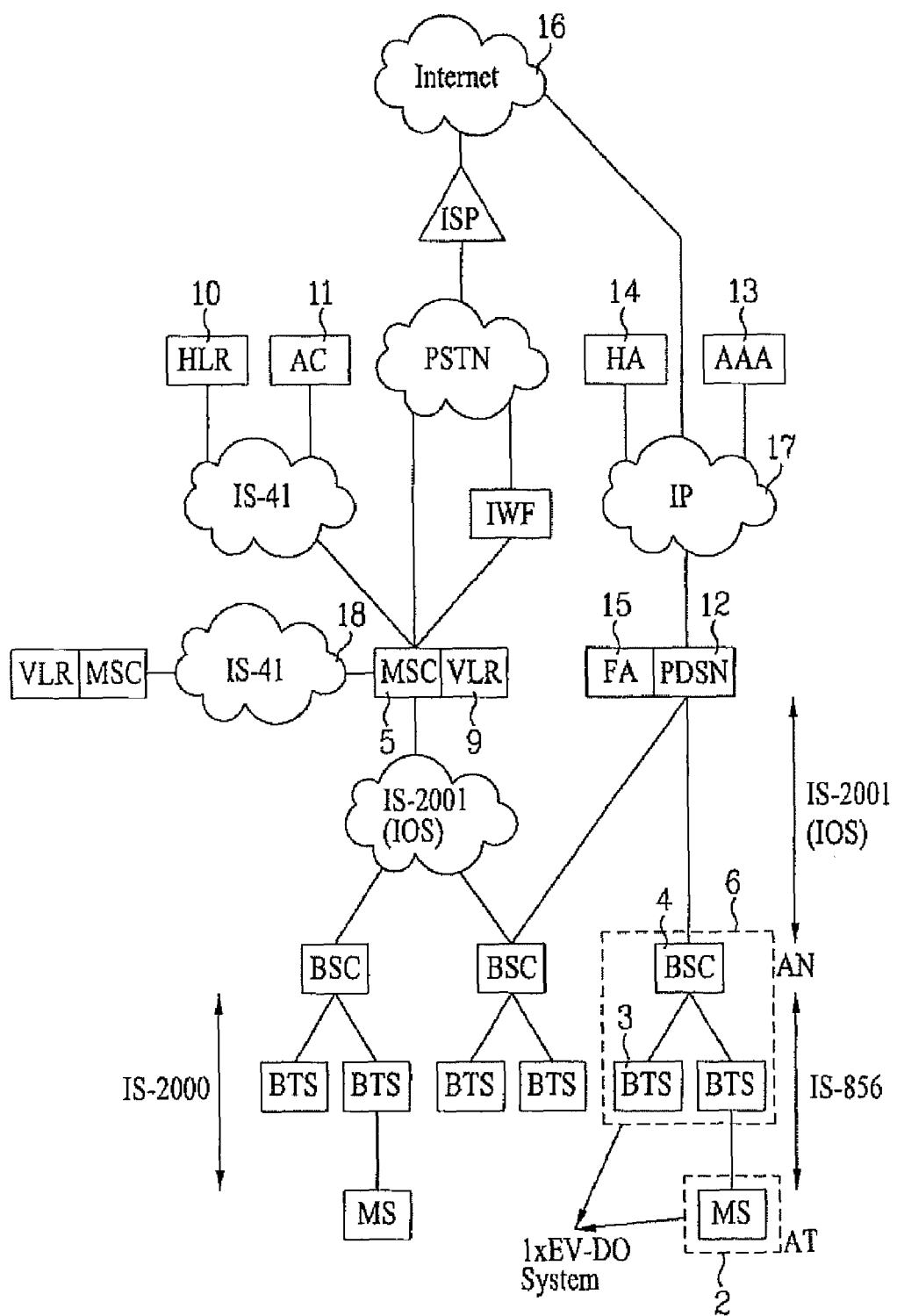
FIG. 12 illustrates a network architecture layer for a 1×EV-DO wireless network.
Figure 13:
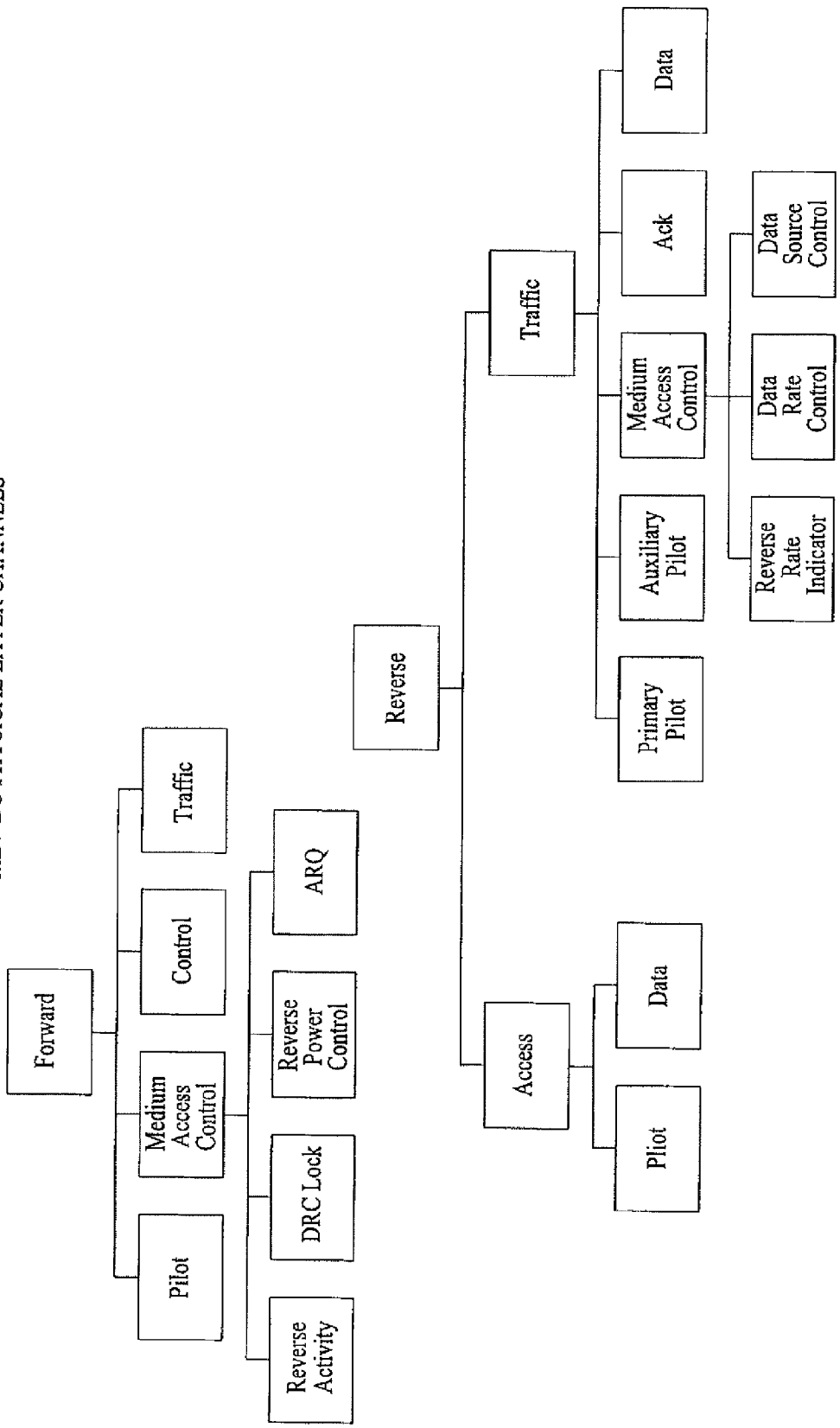
FIG. 13 illustrates 1×EV-DO physical layer channels.
Figure 14:
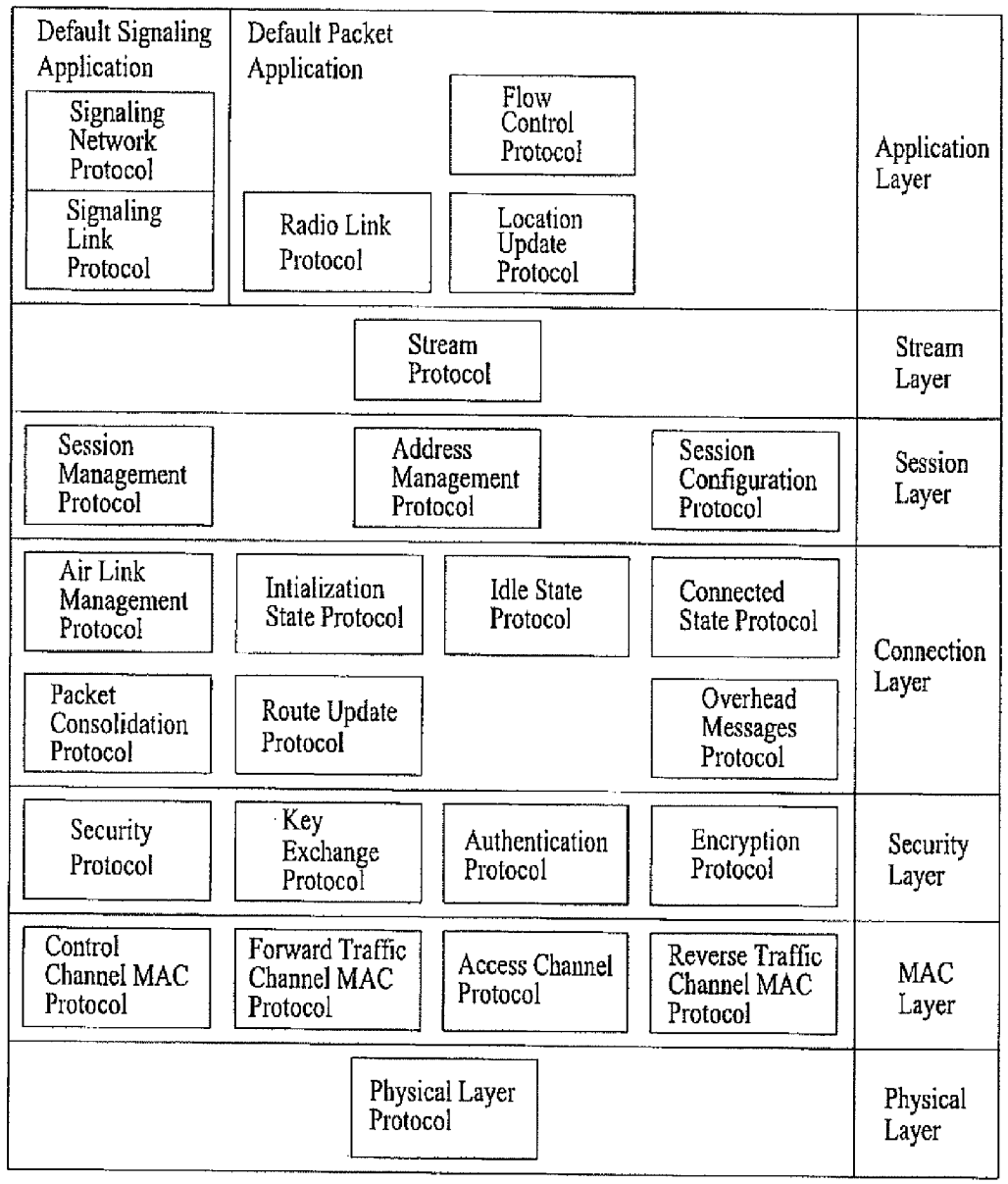
FIG. 14 illustrates 1×EV-DO default protocol architecture.
Figure 15:
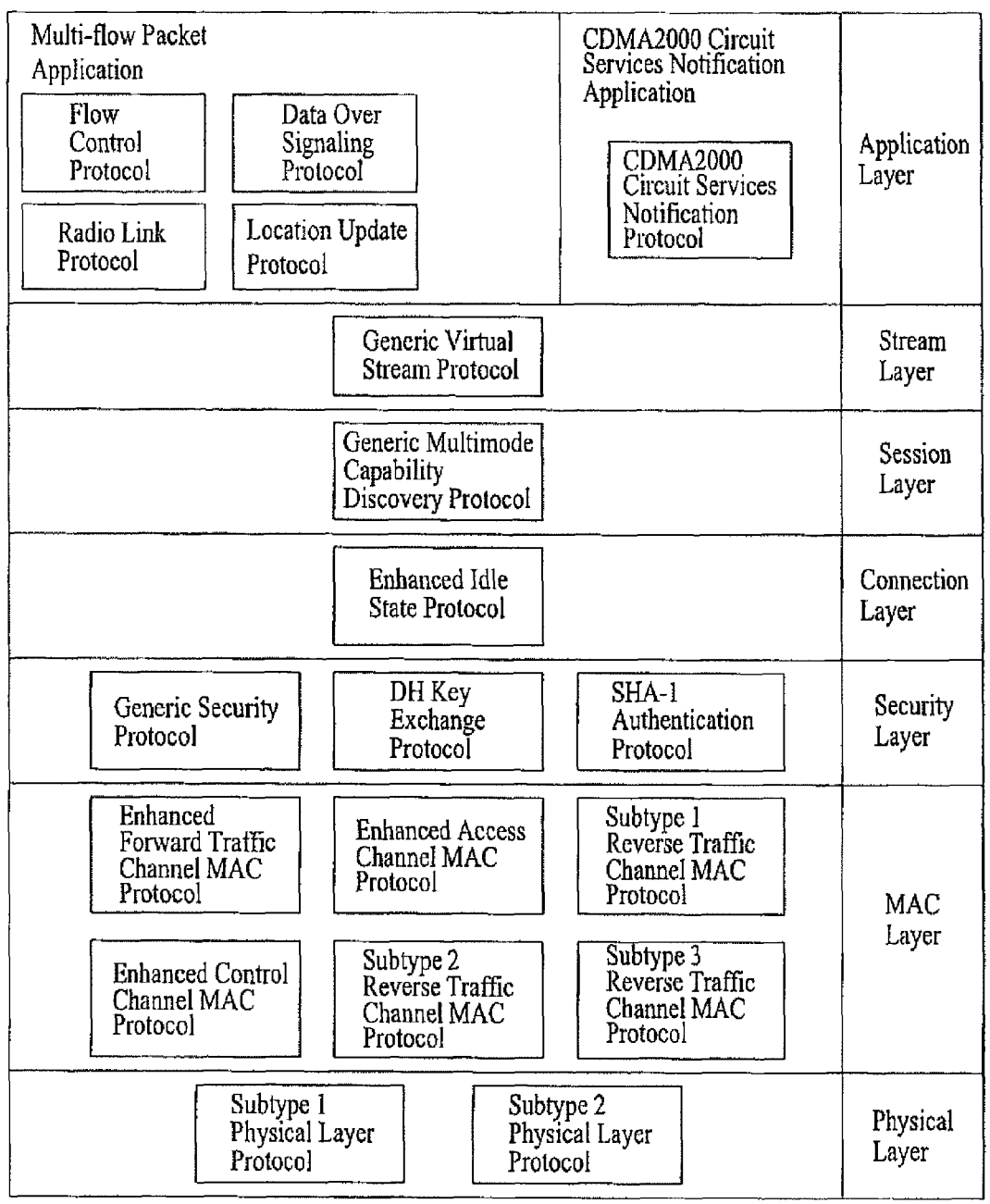
FIG. 15 illustrates 1×EV-DO non-default protocol architecture.
Figure 16:
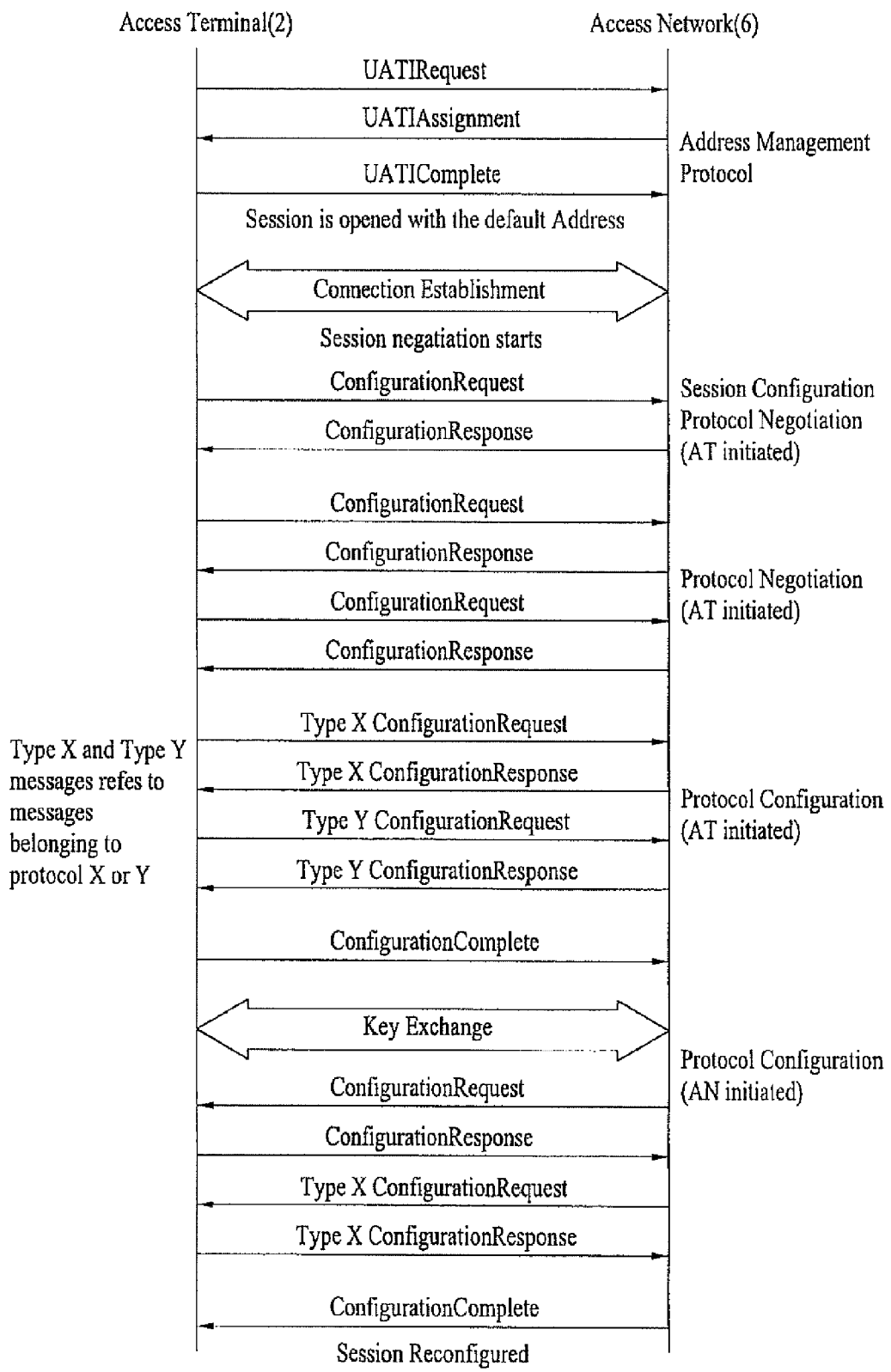
FIG. 16 illustrates 1×EV-DO session establishment.
Figure 17:
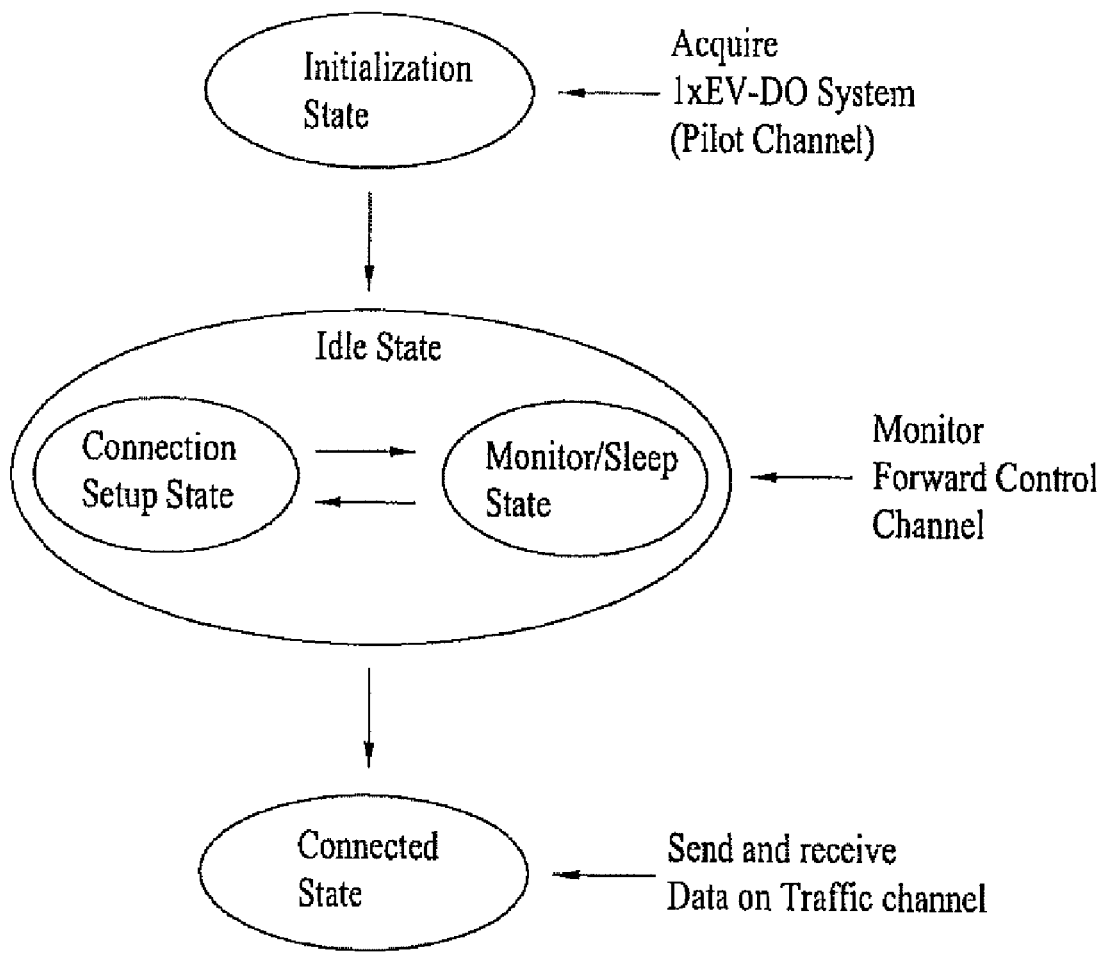
FIG. 17 illustrates 1×EV-DO connection layer protocols.

Reference will now be made in detail to the preferred embodiments of the present invention, examples of which are illustrated in the accompanying drawings. This invention considers mechanisms for improving the proposed high rate packet data (HRPD) system.

Approaches proposed are including PilotGroupID in the sector parameter message to convey the pilot group information, encoding to enable shortened NeighborList messages, improvements on RoutUpdateRequest message for request updates on multiple carriers, inclusion of the channel record of the reference pilot in the RouteUpdate message when the message sent in the connected state, using pilot drop timer of a Candidate Set pilot as a trigger for sending RouteUpdate, encoding the TrafficChannelAssignment message to shorten the message in certain situations, limiting the usage of auxiliary DRC cover in some situations to avoid confusion in determining the serving sector and processing OverheadMessages.Updated Indication and OverheadMessagesNeighborList Initialization in the idle state.

One problem addressed by the present invention is that the data rate control (DRC) cover may point to a sector not associated with the data source control (DSC). For example, auxiliary DRC cover should not be used if the DRCLock is '0' for the cell associated with the data source control (DSC). In order to address this problem, the pilot cover shall be set to a DRC cover and not be set to an auxiliary DRC cover if the access terminal transmits a pilot cover when the DSC associated with that Sub-Active Set is not in effect during the next DRCLength slots following transmission of the DRC or the pilot cover does not belong to the Data Source indicated by the DSC that is in effect during the next DRCLength slots following transmission of the DRC.

Another problem addressed by the present invention is that the SectorParameters message may not convey the PilotGroupID information of the channel transmitting the message or of channels in the current sector. Therefore, occurrences of PilotGroupID may not be correct.

One sector may have multiple channels or carriers, which have different transmission powers or coverage areas. The PilotGroup is a group of channels or carriers from the same sector that have the same coverage area. If an access terminal sees several pilots that have the same PN offset, indicating the same sector, and these pilots have the same PilotGroupID, then the access terminal only needs to report the signal strength for one of the pilots to the AN.

For example, assume that the SectorParameters message indicates the pilot on channel 'A' with PNa and PilotGroupIDx and the access terminal is later assigned forward channels 'B' and 'C' with PNa and PilotGroupIDx in the TrafficChannelAssignment message when the AT enters the connected state. Further assume that the AT is then disconnected and enters the idle state but still has channels 'A', 'B' and 'C' in its neighbor/candidate set.

In the aforementioned case, after the AT in either the connected state or idle state has learned that channels 'A', 'B' and 'C' are in the same PilotGroup, it does not need to report the signal strength for all three pilots even though all three are in the active neighbor/candidate set. The AT can choose to report one of the 'A', 'B' and 'C' pilots.

One solution to this problem is to use the NeighborList message to convey information corresponding to the neighboring sectors to the access terminals when the access terminals are in the Connected State. FIG. 18 illustrates the NeighborList message according to the present invention.

The access network sets the ChannelIncluded field to '1' if a Channel record is included for this neighbor. The access network sets the ChannelIncluded field to '0' otherwise.

The access network may set the first occurrence of this field to '0' if the channel associated with this pilot is the same as the channel that is used to carry this message. If the first occurrence of this field is set to '0', the access terminal assumes that the channel associated with this pilot is the same as the channel on which this message is received.

The access network may set the other occurrences of this field to '0' if the channel associated with this pilot is the same as the channel associated with the previous pilot. The $n^{th}$ occurrence of this field corresponds to the $n^{th}$ occurrence of PilotPN in the record that contains the PilotPN field.

Another solution to this problem is to use the SectorParameters message to convey sector specific information to the access terminals. FIGS. 19A and 19B illustrate the SectorParameters message according to the present invention.

Another problem addressed by the present invention is that processing of OverheadMessages.Updated Indication and OverheadMessagesNeighborList Initialization should be moved out of the connected state section. In order to address this problem, the processing of OverheadMessages.Updated Indication is altered.

Upon receiving OverheadMessages.Updated indication, the access terminal shall perform the OverheadMessages-NeighborList Initialization procedures in the idle state and then perform the Pilot PN Phase Measurement procedures.

Another problem addressed by the present invention is that there is no Channel Record for the reference pilot in the RouteUpdate message. In order to address this problem, a RouteUpdate message including a channel record for the reference pilot is provided, as illustrated in FIG. 20.

The first pilot listed in the RouteUpdate message is a ReferencePilot. The AT usually does not need to specify the forward channel for the pilot since the pilot is on the forward link channel associated with the reverse link channel on which the RouteUpdate message is transmitted.

This assumption is still true in the idle state in a multicarrier system, in which the AT only accesses on one reverse link channel. However, the AT may have multiple reverse link channels in the connected state and the AT may send the RouteUpdate message on a reverse channel which is not the associated reverse link channel of the forward link channel sending the ReferencePilot. In this situation, the channel of the ReferencePilot should be specified.

The access terminal shall set the ChannelIncluded field to '1' if the following Channel record is included in the message. Otherwise, the access terminal shall set the ChannelIncluded field to '0'. If the Channel record is not included, the pilot has the same channel as the reference pilot.

If the message is sent on the access channel, the access terminal shall omit the ATTotalPilotTransmissionIncluded field. Otherwise, the access terminal shall include the ATTotalPilotTransmissionIncluded field and set it to '1'.

The access terminal shall not include the ReferencePilotChannelIncluded field when the message is sent on the access channel. When this message is being sent on the reverse traffic channel, the access terminal shall include the ReferencePilotChannelIncluded field.

If the ReferencePilotChannelIncluded field is included and the ReferencePilotChannel is the FDD-paired forward CDMA channel associated with the reverse CDMA channel on which this message is being sent, the access terminal shall set the ReferencePilotChannelIncluded field to '0'. If the ReferencePilotChannelIncluded field is included and the ReferencePilotChannel is not the FDD-paired forward CDMA channel associated with the reverse CDMA channel on which this message is being sent, the access terminal shall set the ReferencePilotChannelIncluded field to '1'.

The access terminal shall include the ATTotalPilotTransmission field only if ATTotalPilotTransmissionIncluded is included and is set to '1'. If included, the access terminal shall set the ATTotalPilotTransmission field to the current total average transmission power of pilot(s) when the transmitter is enabled in units of 0.5 dbm. This field is expressed as a two's complement signed number.

The access terminal shall include the ReferencePilotChannel field only if ReferencePilotChannelIncluded is included and is set to '1'. If included, the access terminal shall set the ReferencePilotChannel to the channel record corresponding to the reference pilot. The channel record defines the carrier frequency for the reference pilot channel.

Another problem addressed by the present invention is that the RouteUpdateRequest message can only request updates of one CDMA channel. In order to address this problem, the access network sends a RouteUpdateRequest message to request the access terminal to send a RouteUpdate message. The RouteUpdateRequest message according to the present invention is illustrated in FIG. 21.

The access network sets the ChannelIncluded field to '1' if a Channel record is included for this neighbor. The access network sets the ChannelIncluded field to '0' otherwise.

The access network may set the ChannelIncluded field to '0' if the channel associated with this pilot is the same as the channel associated with the previous pilot, The $n^{th}$ occurrence of this field corresponds to the $n^{th}$ occurrence of PilotPN in the record that contains the PilotPN field.

If ChannelIncluded is set to '0', the access network shall omit the Channel field. Otherwise, the access network shall set the Channel field to a Channel record specification. The access network shall set the SystemType field of this record to 0×00.

Another problem addressed by the present invention is that the access network may add a pilot no longer in the Candidate Set to the Active Set. In order to address this problem, a pilot drop timer is used such that if the pilot drop timer of an Active or Candidate Set pilot has expired and a RouteUpdate message carrying this information has not been sent since the last ResetReport message was received, then the access terminal shall send a RouteUpdate message.

Another problem addressed by the present invention is that DSCforThisFLEnabled and DSCSameAsThisForwardChannel fields in TCA message are not needed if SymmetricModeEnabled is set to '1'. In order to address this problem, the DSCforThisFLEnabled and DSCSameAsThisForwardChannel fields are selectively included in TCA message, thereby allowing a shorted TCA message.

The access network shall only include the DSCforThisFLEnabled field if the SymmetricModeEnabled field is set to '1'. The access network shall set the DSCforThisFLEnabled field to '1' to indicate that the access terminal shall transmit a DSC channel for the forward link CDMA channel specified by the AssignedChannel. The DSC channel is to be transmitted on the same reverse link CDMA channel that carries the DRC and ACK for the forward link CDMA channel specified by the AssignedChannel.

The access network shall only include the DSCSameAsThisForwardChannel field if the SymmetricModeEnabled field is set to '1'. The access network shall set the DSCSameAsThisForwardChannel field to indicate that the DSC value associated with the forward CDMA channel specified by the AssignedChannel and the forward CDMA channel specified by the value of this field shall be the same. If the value of the DSCSameAsThisForwardChannel field is n, then the forward CDMA channel specified by the field is the $n^{th}$ forward link CDMA channel in the ascending order of frequency that is assigned to the access terminal in this message.

The access network shall set the DSCSameAsThisForwardChannel field to '0' to indicate that the DSC value associated with the forward CDMA channel specified by the AssignedChannel is independent of the DSC value for the other forward link CDMA channels. If the DSCforThisFLEnabled field is set to '0', then the DSCSameAsThisForwardChannel field shall not be set to '0'.

Another problem addressed by the present invention is that the SchedulerTag and AuxDRCCover fields in the TCA message are not needed if no TrafficMACIndex assigned for the pilot. In order to address this problem, the NumUniqueTrafficMACIndexes field is included within the TCA message as illustrated in FIG. 22, thereby allowing several fields to be omitted under certain conditions.

For some traffic channel assignments, the number of reverse links for traffic is greater than the number of forward links for traffic. In this situation, the reverse link, whose associated forward link does not carry traffic, only needs the MACIndex control word for this forward link and does not need TrafficMACIndex, SchedulerTag or AuxDRCCover, which are associated with data traffic. By moving the NumUniqueTrafficMACIndexes field, the SchedulerTag, AuxDRCCoverIncluded and AuxDRCCover fields can be omitted in this situation. The TrafficMACIndexPerInterlaceEnabled field can also be omitted in some situations if NumUniqueTrafficMACIndexes is set to a value other than 1.

The access network shall only include the NumUniqueTrafficMACIndexes field if the SectorInThisFrequencyIncluded field is set to '1'. If included, the access network shall set the NumUniqueTrafficMACIndexes field to the number of unique TrafficMACIndex fields that are assigned to the access terminal. A value greater than 1 indicates that the TrafficMACIndex assignment will be made per interlace.

The access network shall omit the SchedulerTag field if the SchedulerTagIncluded field is set to '0', NumUniqueTrafficMACIndexes is set to 0, or SectorInThisFrequencyIncluded field is set to '0'. Otherwise, the access network shall include the SchedulerTag field and set it to a number that indicates the Scheduler Group to which this pilot belongs.

The access network shall only include the AuxDRCCoverIncluded field if the SectorInThisFrequencyIncluded field is set to '1' and NumUniqueTrafficMACIndexes is not set to 0. If included, the access network shall set the AuxDRCCoverIncluded field to '1' if the following AuxDRCCover field is included.

The access network shall omit the AuxDRCCover field if the AuxDRCCoverIncluded field is either not included or included but set to '0'. If included, the access network shall set the AuxDRCCover field to the auxiliary DRC Cover associated with the sector specified in this record.

The access network shall only include the TrafficMACIndexPerInterlaceEnabled field if the NumUniqueTrafficMACIndexes field is included and set to 1. If included, the access network shall set the TrafficMACIndexPerInterlaceEnabled field to indicate whether or not the TrafficMACIndex assignment is made per interlace for this member of the Active Set.

Setting the TrafficMACIndexPerInterlaceEnabled to '1' indicates that the TrafficMACIndex assignment will be made per interlace. Setting the TrafficMACIndexPerInterlaceEnabled to '0' indicates that the TrafficMACIndex assignment is valid for all interlaces for this member of the Active Set.

The AssignedInterlaces field is present only if TrafficMACIndexPerInterlaceEnabled is included and is set to '1' or if NumUniqueTrafficMACIndexes is set to a value greater than 1. If included, the access network shall set the AssignedInterlaces field to indicate interlaces associated with the assigned TrafficMACIndex field below.

Setting 'the $k^{th}$ position of the AssignedInterlaces field to 1' indicates that the corresponding next TrafficMACIndex field is valid on the interlace k−1. Setting the $k^{th}$ position of this of the AssignedInterlaces field to '0' indicates that the access terminal will not be served in the interlace k−1 with the TrafficMACIndex specified in the following field.

If the TrafficMACIndexPerInterlaceEnabled is included and is set to '1' or NumUniqueTrafficMACIndexes is set to a value greater than 1, then the access network shall set the TrafficMACIndex field to the MAC Index assigned to the access terminal corresponding to this pilot on the interlace(s) specified by AssignedInterlaces. If the TrafficMACIndexPerInterlaceEnabled is included and is set to '0', then the access network shall set the TrafficMACIndex field to the MAC Index assigned to the access terminal on all of the forward link interlaces. This MAC Index identifies packets that are destined for this access terminal.

Figure 23:
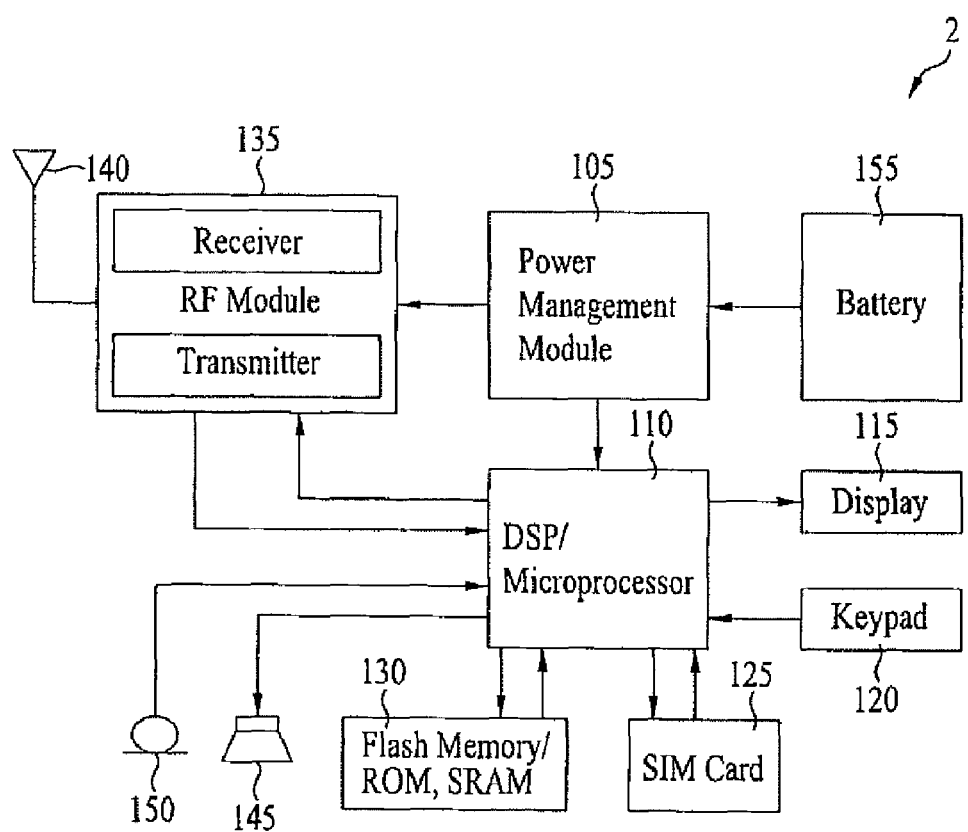
FIG. 23 illustrates a block diagram of a mobile station or access terminal.

FIG. 23 illustrates a block diagram of a mobile station (MS) or access terminal 2. The AT 2 includes a processor (or digital signal processor) 110, RF module 135, power management module 105, antenna 140, battery 1551 display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, transmit radio signals comprising voice communication data. The RF module 135 comprises a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein with regard to cdma2000 or 1×EV-DO systems.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for providing information to a network in a multi-carrier mobile communication system comprising a terminal that communicates with the network over a plurality of carriers, the method comprising:

transmitting a message to the network, the message comprising an ATTotalPilotTransmissionIncluded field and a ReferencePilotChannel field, wherein the ATTotalPilotTransmissionIncluded field indicates that the message is not sent on an access channel, wherein the ReferencePilotChannel field indicates a channel record corresponding to a reference pilot, and wherein the message further comprises a ReferencePilotChannelIncluded field indicating whether or not a reference pilot channel is an FDD (Frequency-Division Duplex)-paired forward CDMA (Code Division Multiple Access) channel associated with a reverse channel on which the message is being transmitted.

2. The method of claim 1, wherein the message is a RouteUpdate message.

3. The method of claim 1, wherein the channel record corresponding to the reference pilot defines a specific one of the plurality of carriers for the reference pilot channel.

4. The method of claim 1, wherein the ReferencePilotChannel field is omitted if the reference pilot channel is not the FDD-paired forward CDMA channel associated with the reverse channel on which the message is being transmitted.

* * * * *